(12) United States Patent
King

(10) Patent No.: US 7,108,601 B2
(45) Date of Patent: Sep. 19, 2006

(54) GRAIN THRESHING DEVICE

(76) Inventor: John Andrew King, PO Box 54, Ongerup, WA 6336 (AU)

( * ) Notice: Subject to any disclaimer, the term of this patent is extended or adjusted under 35 U.S.C. 154(b) by 0 days.

(21) Appl. No.: 10/502,221

(22) PCT Filed: Jan. 24, 2003

(86) PCT No.: PCT/AU03/00069

§ 371 (c)(1),
(2), (4) Date: Jan. 21, 2005

(87) PCT Pub. No.: WO03/061368

PCT Pub. Date: Jul. 31, 2003

(65) Prior Publication Data

US 2005/0130724 A1 Jun. 16, 2005

(30) Foreign Application Priority Data

Jan. 25, 2002 (AU) .................... PS0130
Mar. 7, 2002 (AU) .................... PS0928

(51) Int. Cl.
*A01F 11/06* (2006.01)
*A23N 5/00* (2006.01)
*B02B 3/00* (2006.01)

(52) U.S. Cl. .................................... 460/46

(58) Field of Classification Search ............ 56/16.5; 460/59, 61, 62, 64, 65, 67, 68, 71, 77, 45, 460/46; 209/252, 350, 270, 250, 28
See application file for complete search history.

(56) References Cited

U.S. PATENT DOCUMENTS

| 510,769 | A | * | 12/1893 | Bodine | 99/522 |
| 739,908 | A | * | 9/1903 | Nightingale | 209/28 |
| 1,158,304 | A | * | 10/1915 | Schaub | 422/269 |
| 1,496,701 | A | | 6/1924 | Wyman | |
| 2,931,362 | A | * | 4/1960 | Carlson | 460/46 |
| 4,285,348 | A | * | 8/1981 | Vogel | 460/61 |
| 4,337,782 | A | * | 7/1982 | Da Silva | 460/64 |
| 4,724,632 | A | * | 2/1988 | Bilsland et al. | 47/58.1 R |
| 5,041,058 | A | * | 8/1991 | Quimby | 460/61 |
| 5,106,340 | A | * | 4/1992 | Quimby | 460/61 |

FOREIGN PATENT DOCUMENTS

DE 301 093 C 10/1917

* cited by examiner

*Primary Examiner*—Árpád Fábián Kovács
(74) *Attorney, Agent, or Firm*—Cook, Alex, McFarron, Manzo, Cummings & Mehler, Ltd.

(57) ABSTRACT

A grain threshing device (10) comprising a receptacle (12) or receiving a portion of crop head. The receptacle (12) has a plurality of longitudinal ribs (30) on inner surfaces. One or more flexible arm members (28) are arranged on a rotating shaft (22) within the receptacle (12) such that the flexible arm members (28) strike the ribs (30) during rotation. The action of the flexible arm members (28) and ribs (30) on the crop head within the receptacle (12) separates the grain from the crop head.

29 Claims, 4 Drawing Sheets

GRAIN THRESHING DEVICE

FIELD OF THE INVENTION

The present invention relates to a grain threshing device.

Various types of machinery are used for the purpose of threshing grain. A known problem which many types of such machinery is that due to the mechanical arrangement of the threshing apparatus, the grain can be cracked during the threshing process.

Also, it is often necessary in the production of grain crops to extract small quantities of grain before harvest in order to have them tested. The testing process provides information on a range of characteristics of the grain and is used to determine the value of the crop. However, as the equipment available to extract grain is generally in the form of heavy machinery designed to extract the grain in large quantities, it is therefore relatively inefficient to move this equipment between a number of crops to extract the small amount of grain required for testing purposes.

The present invention provides an improved device for threshing grain and a portable grain thresher utilising the improved device.

SUMMARY OF THE INVENTION

In accordance with one aspect of the present invention there is provided a grain threshing device comprising:

a receptacle arranged to receive a portion of crop head, the receptacle having a plurality of longitudinal ribs on inner surfaces thereof;

a shaft rotatably mounted within the receptacle; and one or more flexible arm members extending from the shaft, the arm members being arranged to strike the longitudinal ribs upon rotation of the shaft;

wherein rotation of the shaft and the flexible arm members causes the arm members to strike the crop head in the receptacle to separate the grain from the crop head.

In accordance with a second aspect of the present invention there is provided a portable grain thresher comprising:

a portable receptacle arranged to receive a portion of crop head, the receptacle having a plurality of longitudinal ribs on inner surfaces thereof;

a shaft rotatably mounted within the receptacle, the shaft having an end thereof engageable with a portable drive means; and one or more flexible arm members extending from the shaft, the arm members being arranged to strike the longitudinal ribs upon rotation of the shaft;

wherein the portable drive means causes rotation of the shaft and the arm members such that the arm members strike the crop head in the receptacle to separate the grain from the crop head.

BRIEF DESCRIPTION OF THE DRAWINGS

The present invention will now be described, by way of example, with reference to the accompanying drawings, in which.

DESCRIPTION OF THE INVENTION

Figure 1:
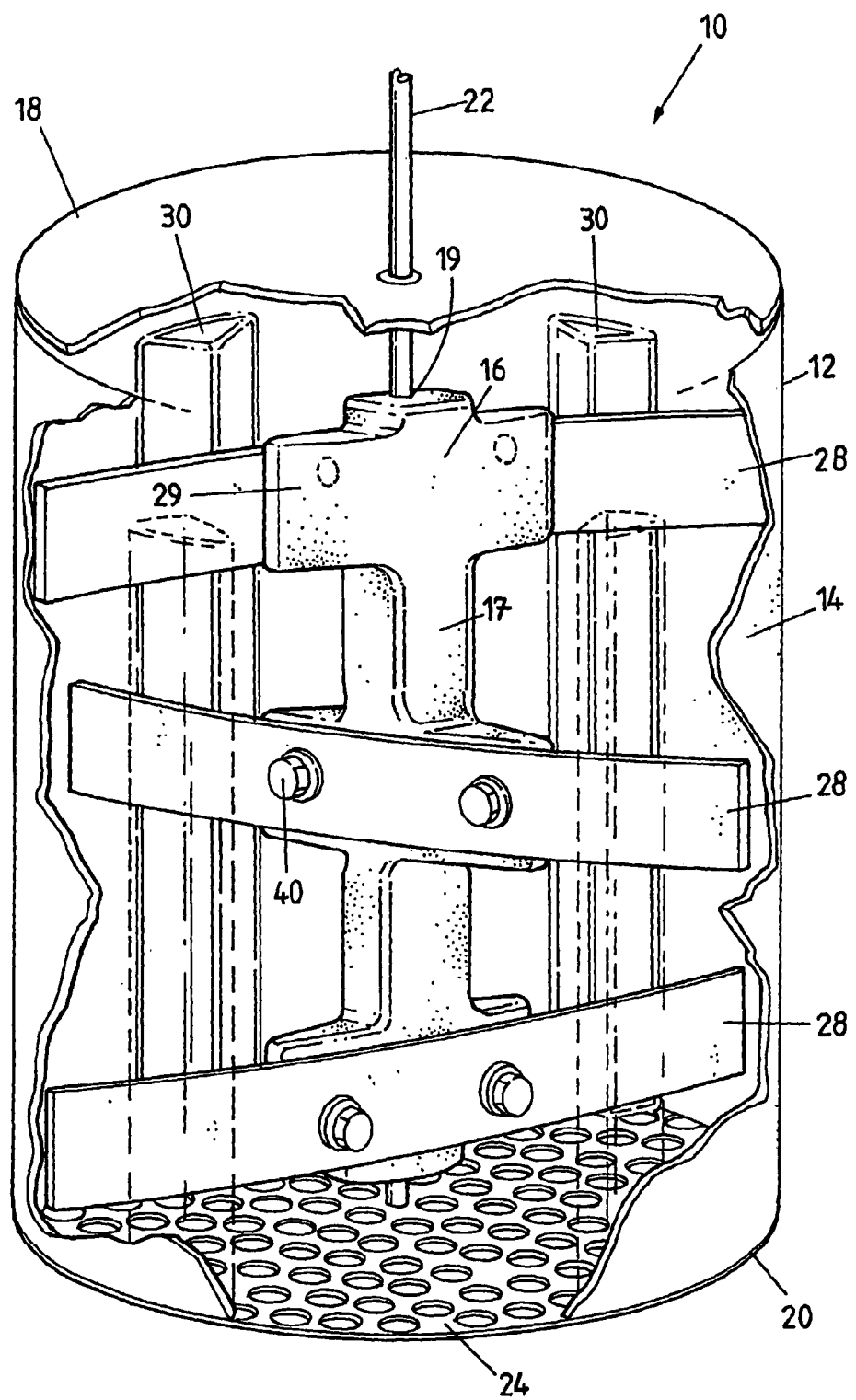
FIG. 1 is an upper perspective view of a grain threshing device in accordance with the present invention with a portion of the vessel cut away.

Referring to FIG. 1, there is shown a grain threshing device 10. The grain threshing device 10 comprises a receptacle 12 in the form of a cylindrical vessel 14. The cylindrical vessel 14 includes a first end 18 through which grain crop head may be received and a suitably sized mesh 24 across an open second end 20.

The grain threshing device 10 includes a rotatably mounted shaft 22 arranged to extend along a central longitudinal axis of the cylindrical vessel 14 from the first end 18 to the second end 20.

The shaft 22 is provided with a mounting means 16 for securing a plurality of flexible arm members 28 to the shaft 22. The mounting means 16 comprises an elongate member 17 having a longitudinal bore 19 to receive the shaft 22. The elongate member 17 includes a plurality of transversely extending portions 29. The transversely extending portions 29 are arranged in pairs such that the pairs of transversely extending portions 29 extend outwardly from opposed sides of the elongate member 17. The transversely extending portions may be arranged such that each pair of transversely extending portions 29 are angularly offset from adjacent pairs of transversely extending portions 29 on the shaft 22. Each arm member 28 is secured to one of the transversely extending portions 29 such that the arm members 28 are arranged to extend transversely to the shaft member 22. The arm members 28 are in the form of flat elongate strips constructed of a flexible material such as rubber and are secured to the transversely extending portions 29 by any suitable means, such as by bolts 40 provided adjacent outer ends of the transversely extending portions 29 as shown in FIG. 1.

The cylindrical vessel 14 is also provided with a plurality of inwardly protruding ribs 30. The inwardly protruding ribs 30 are arranged longitudinally at regular angular intervals around the inner surface of the cylindrical vessel 14. The arrangement of the inwardly protruding ribs 30 and the arm members 28 is such that outer ends of the arm members 28 strike the inwardly protruding ribs 30 when the shaft 22 is rotated. The ribs 30 in the embodiment shown have a generally triangular transverse cross section.

The shaft 22 is arranged to be engageable with a drive means (not shown). The drive means may be any device suitable for rotating the shaft 22.

The mesh 24 may also be removable from the cylindrical vessel 14 so that different sized mesh 24 may be used for different grain crops.

A collecting vessel (not shown in FIG. 1) is provided below the mesh 24 to collect the separated grain.

Figure 2:
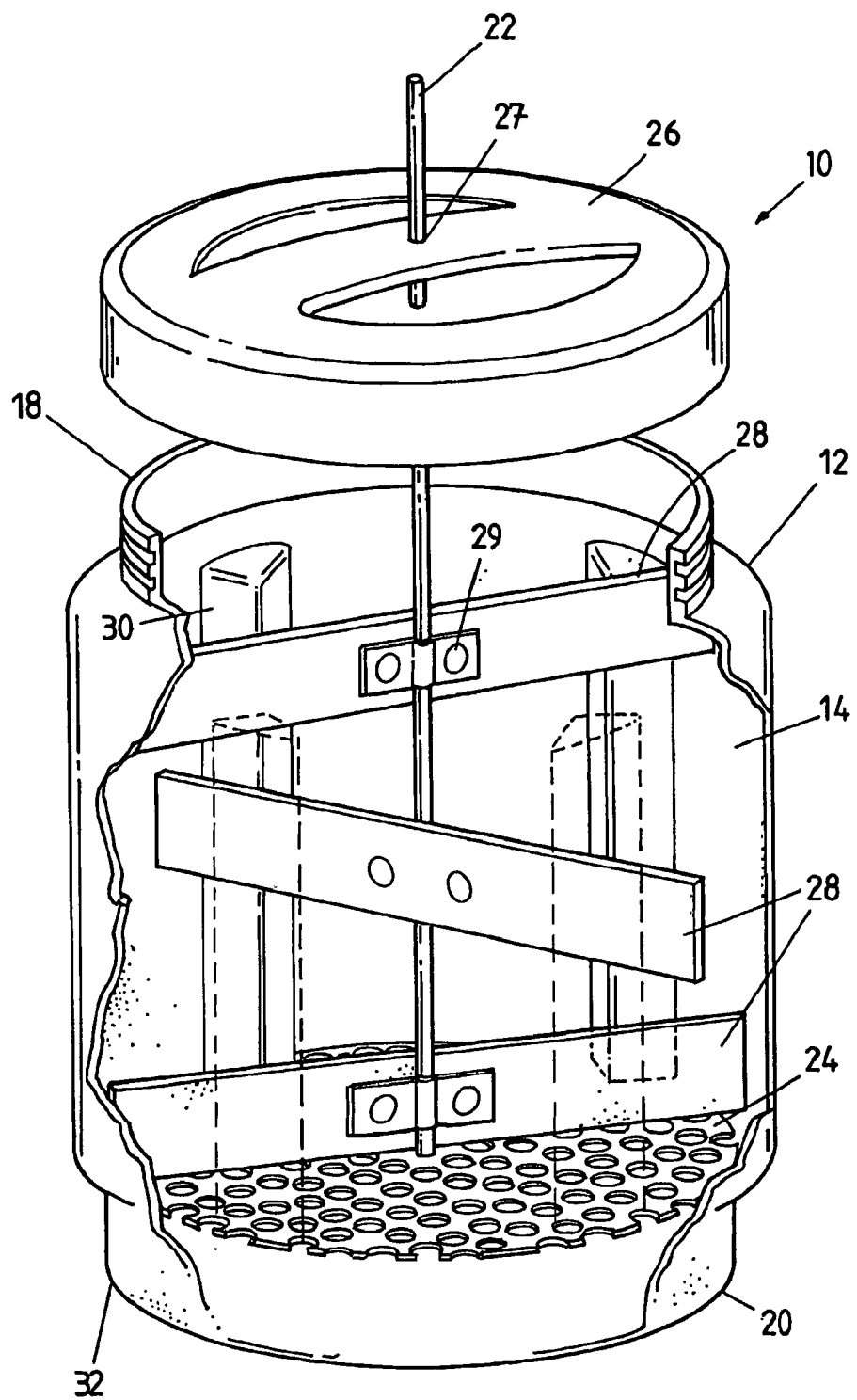
FIG. 2 is an upper perspective view of a portable grain thresher in accordance with the second aspect of the present invention with a portion of the vessel cut away.
Figure 3:
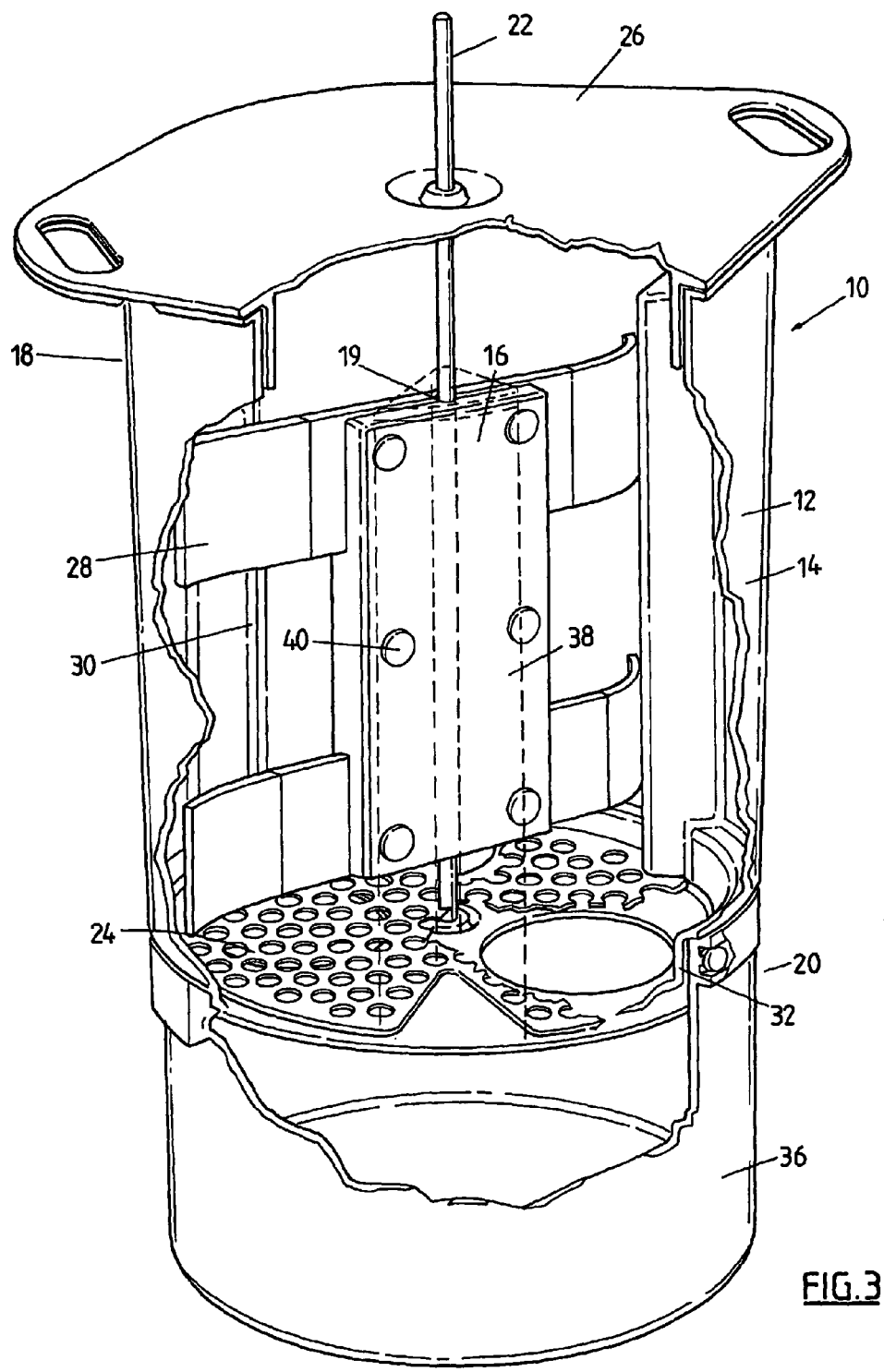
FIG. 3 is an upper perspective of an alternative embodiment of a portable grain thresher in accordance with the second aspect of the present invention with a portion of the vessel cut away.
Figure 4:
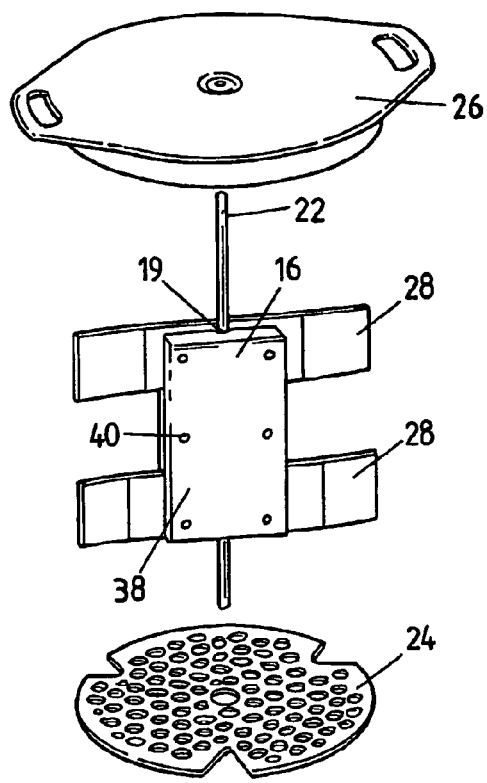
FIG. 4 is an exploded view of the portable grain thresher of FIG. 3.
Figure 4:
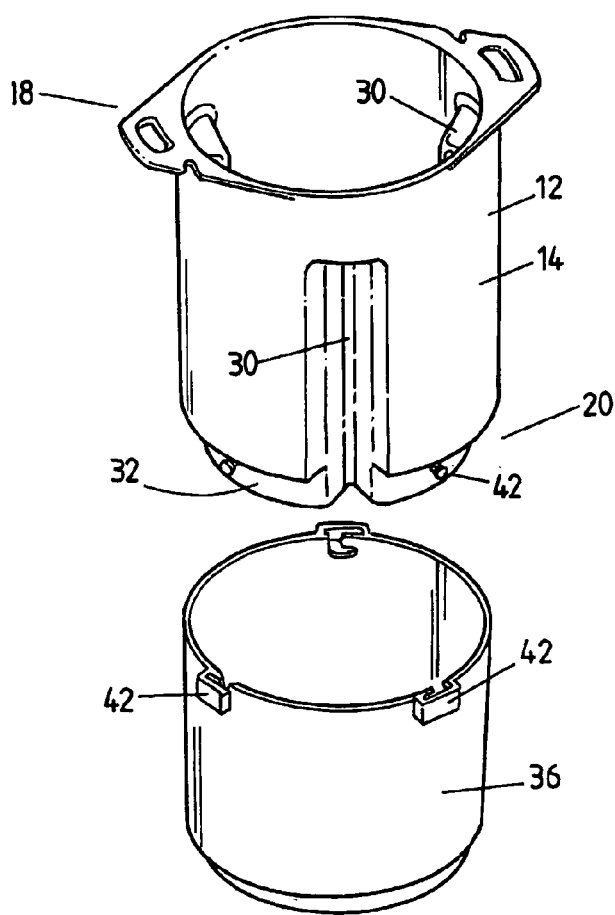

FIGS. 2 to 4 show a portable threshing device 10 in accordance with the invention where like numerals denote like parts.

The cylindrical vessel 14 of the portable grain thresher 10 comprises a receptacle 12 which is constructed to be of a size and weight such that it can be easily carried to various locations at which a sample of crop needs to be extracted. The receptacle 12 has a removable lid 26 at the first end 18.

A first end of the shaft 22 is arranged to extend through a hole 27 provided in the lid 26, when the lid 26 is secured to the cylindrical vessel 14. The shaft 22 is rotatably secured adjacent a second end thereof within a suitably sized aperture provided within the mesh 24.

The arm members 28 are secured directly to the shaft 22 in the embodiment shown in FIG. 2 by securing means 29 and are angularly offset relative to each other. In the embodiment shown in FIGS. 3 and 4, the arm members 28 are secured to a mounting means 16 mounted on the shaft 22. The mounting means 16 is in the form of a rectangular plate member 38. The arm members 28 are secured to a surface of the rectangular plate member 38 by bolts 40.

The second end of the shaft 22 is arranged to be engageable with a portable drive means (not shown). The portable drive means may be in the form of a cordless drill. The second end 20 of the cylindrical vessel 14 may also be provided with a narrowed portion 32. The narrowed portion 32 is arranged such that it may be received within a collecting vessel 36 as shown in FIG. 3. The narrowed portion 32 and an upper edge of the collection vessel 36 are preferably provided with locking means 42 so that the vessel 14 may be secured to the collection vessel 36 in use.

In use, crop head is removed and placed into the cylindrical vessel 14. The drive means is secured to the first end of the shaft 22 and activated to rotate the shaft 22 and the flexible arm members 28. The action of the flexible arm members 28 striking the crop head and the ribs 30 act to thresh the crop head. The separated grain then falls through the mesh 24 and into the collecting vessel. Any chaff which is small enough to pass through the mesh 24 can be removed by pouring the grain and chaff from the collecting vessel into a further vessel and allowing the wind to blow away the lighter chaff.

Modifications and variations as would be apparent to a skilled addressee are deemed to be within the scope of the present invention

The invention claimed is:

1. A grain threshing device by comprising:
   a receptacle arranged to receive a portion of crop head, the receptacle being dimensioned to enable the grain threshing device when in use to be held by a person, the receptacle having a cylindrical inner face, the inner face of the receptacle having a plurality of axial ribs; and
   a shaft rotatably mounted within the receptacle; the shaft supporting a plurality of flexible arm members extending substantially radially from the shaft, the arm members being dimensioned to extend from the shaft to the inner face such that their outer ends are to be able to strike the axial ribs upon rotation of the shaft.

2. A grain threshing device as claimed in claim 1, wherein the receptacle comprises a cylindrical vessel and the shaft is rotatably mounted to extend along a central longitudinal axis of the cylindrical vessel.

3. A grain threshing device as claimed in claim 1, wherein the flexible arm members are arranged to extend transversely to the shaft.

4. A grain threshing device as claimed in claim 1 wherein flexible arm members comprise flat elongate strips wherein the outer ends of the elongate strips are arranged to strike the axial ribs in use.

5. A grain threshing device as claimed in claim 2, wherein a removable lid is provided at one end of the receptacle, through which the crop head is in use able to be introduced into the receptacle, and a mesh is provided across another end of the receptacle, through which the threshed grain exits the receptacle.

6. A grain threshing device as claimed in claim 5, wherein the mesh is removable such that different mesh sizes may be used for different grain crops.

7. A grain threshing device as claimed in claim 3, wherein the arm members are supported from the shaft by a mounting means, said mounting means having a longitudinal bore within which the shaft is received, the flexible arm members being secured to the mounting means.

8. A grain threshing device as claimed in claim 7, wherein the mounting means comprises an elongate member having a plurality of transversely extending portions extending outwardly from opposed sides of the elongate member, the flexible arm members being secured to the transversely extending portions.

9. A grain threshing device as claimed in claim 7, wherein the mounting means comprises a rectangular plate member, the flexible arm members being secured to a surface of the rectangular plate member.

10. A grain threshing device as claimed in claim 1, wherein the axial ribs are arranged at regular angular intervals around the inner face of the receptacle.

11. A grain threshing device as claimed in any one of the preceding claims, wherein the axial ribs have a generally triangular transverse cross section.

12. A grain threshing device as claimed at claim 3, wherein flexible arm members comprise flat elongate strips wherein the distal ends of the elongate strips are arranged to strike the axial ribs in use.

13. A portable grain thresher comprising:
   a receptacle arranged to receive a portion of crop head, the receptacle having a cylindrical inner face, the inner face of the receptacle having a plurality of axial ribs spaced around inner face;
   a shaft rotatably mounted within the receptacle, the shaft having an end external of the receptacle which in use is able to be engaged with a portable drive means; and
   one or more flexible arm members extending from the shaft, the arm members being dimensioned to extend from the shaft to the inner face such that their outer ends are to be able to strike the axial ribs upon rotation of the shaft;
   wherein in use the portable drive means causes rotation of the shaft and the arm members such that the arm members strike the crop head in the receptacle to separate the grain from the crop head.

14. A portable grain thresher as claimed in claim 13, wherein the receptacle comprises a cylindrical vessel and the shaft is rotatably mounted to extend along a central longitudinal axis of the cylindrical vessel.

15. A portable grain thresher as claimed in claim 13, wherein the flexible arm members are arranged to extend transversely to the shaft.

16. A portable grain thresher as claimed in claim 13, wherein flexible arm members comprise flat elongate strips wherein in use the outer ends of the elongate strips are arranged to strike the axial ribs.

17. A portable grain thresher as claimed in claim 14, wherein a removable lid is provided at one end of the receptacle, through which in use the crop head is to be introduced into the receptacle, and a mesh is provided across another end of the receptacle, through which the threshed grain exits the receptacle.

18. A portable grain thresher as claimed in claim 17, wherein the mesh is removable such that different mesh sizes may be used for different grain crops.

19. A portable grain thresher as claimed in claim 17, wherein the shaft is rotatably secured within a hole in the removable lid and within an aperture in the mesh.

20. A portable grain thresher as claimed in claim 18, wherein the portable grain thresher further comprises a collection vessel, the another end of the receptacle is provided with a reduced diameter portion which in use is to be received within the collection vessel.

21. A portable grain thresher as claimed in claim 20, wherein locking means are provided on the reduced diameter portion and the collection vessel to removably secure the receptacle to the collection vessel.

22. A portable grain thresher as claimed in claim 15, wherein the arm members are supported from the shaft by a mounting means having a longitudinal bore within which the shaft is received, the flexible arm members being secured to the mounting means.

23. A portable grain thresher as claimed in claim 22, wherein the mounting means comprises an elongate member having a plurality of transversely extending portions extending outward from opposed sides of the elongate member, the flexible arm members being secured to the transversely extending portions.

24. A portable grain thresher as claimed in claim 22, wherein the mounting means comprises a rectangular plate member, the flexible arm members being secured to a surface of the rectangular plate member.

25. A portable grain thresher as claimed in any one of claims 13 to 24, wherein the axial ribs are arranged at regular angular intervals around the inner surface of the receptacle.

26. A portable grain thresher as claimed in any one of claims 13 to 25, wherein the axial ribs have a generally triangular transverse cross section.

27. A grain threshing device as claimed at claim 15, wherein flexible arm members comprise flat elongate strips wherein the distal ends of the elongate strips are arranged to strike the axial ribs in use.

28. A grain threshing device comprising: a receptacle arranged to receive a portion of crop head, the receptacle being dimensioned to enable the grain threshing device when in use to be held by a person; the receptacle having a cylindrical inner face, the inner face of the receptacle having a plurality of axial ribs; a shaft rotatably mounted within the receptacle; the shaft supporting a plurality of flexible arm members extending substantially radially from the shaft; the arm members being dimensioned to extend from the shaft to the inner face such that their outer ends are to be able to strike the axial ribs upon rotation of the shaft; wherein flexible arm members comprise flat elongate strips wherein the outer ends of the elongate strips are arranged to strike the axial ribs in use;

and the axial ribs are arranged at regular angular intervals around the inner face of the receptacle.

29. A portable grain thresher comprising: a receptacle arranged to receive a portion of crop head; the receptacle having a cylindrical inner face, the inner face of the receptacle having a plurality of axial ribs spaced around inner face; a shaft rotatably mounted within the receptacle, the shaft having an end external of the receptacle which in use is able to be engaged with a portable drive means; and one or more flexible arm members extending from the shaft, the arm members being dimensioned to extend from the shaft to the inner face such that their outer ends are to be able to strike the axial ribs upon rotation of the shaft; a removable lid is provided at one end of the receptacle, through which in use the crop head is to be introduced into the receptacle, and a mesh is provided across the other end of the receptacle, through which the threshed grain exits the receptacle; and the axial ribs are arranged at regular angular intervals around the inner face of the receptacle wherein in use the portable drive means causes rotation of the shaft and the arm members such that the arm members strike the crop head in the receptacle to separate the grain from the crop head.

* * * * *